UNITED STATES PATENT OFFICE.

ALFRED PARAF, OF NEW YORK, N. Y., ASSIGNOR TO THE OLEOMARGARINE MANUFACTURING COMPANY.

IMPROVEMENT IN PURIFYING AND SEPARATING FATS.

Specification forming part of Letters Patent No. 137,564, dated April 8, 1873; application filed February 11, 1873.

*To all whom it may concern:*

Be it known that I, ALFRED PARAF, now residing in the city, county, and State of New York, have made an invention or discovery of new and useful Improvements for the Manufacture of Products from Fresh Animal Fat; and that the following is a full, clear, and exact description and specification of my invention.

It is physiologically and chemically known that the fresh fat of animals is mainly composed of oleomargarine, stearine, and membrane. In the manufacture of tallow the whole mass is heated up at a high temperature; hence its peculiar odor. I found that if the mass is heated at a temperature not surpassing 120° Fahrenheit for about two hours the whole of it will melt the same as at a high temperature, and remain perfectly odorless.

The nutritive property of animal fat is most entirely owing to the oleomargarine it contains, the stearine being constantly oxidized by pulmonary respiration. It appeared to me, therefore, of the greatest importance to separate from fresh fat all its nutritive parts, at the same time keeping it odorless, in order to use the same for domestic, cooking, perfumery, and medical purposes, as well as the raw material for the manufacture of useful articles from it.

The first part of the operation consists in taking the fresh fat and hashing it as fine as possible in a regular meat-hasher; then to introduce it with its own weight of water in a wooden tank able to be heated by means of a steam-pipe. The whole mass is heated at a temperature varying from 100° to 120° Fahrenheit, and stirring it constantly. After two hours all the stearine and oleomargarine will be separated from the membrane or scraps. The whole mass is allowed to cool. The mixture of congealed oleomargarine, stearine, and membrane is separated from the water, which is thrown away, and worked thoroughly, with two per cent. of common salt, between two cylinders. This has for its object to extract most of the water from the fatty mass. It is then introduced in cotton or cotton-flannel bags, which are either introduced in a hand-press, cider-press, or hydraulic press, or in a hydro-extractor similar to those used in sugar-refineries for the purpose of separating the sirup from the crystallized sugar. Either of the above-named operations must functionate in rooms all the time heated at a temperature of 50° to 60° Fahrenheit, which is the melting-point of the oleomargarine, but which has no effect on the stearine or membrane. Therefore, at this temperature and by the means of either of the above-named mechanical separations the melted oleomargarine is separated from the solid stearine and membrane, and, after being congealed, worked again between two cylinders, with two per cent. of salt to separate the last trace of water, composes a substance highly suited for domestic and cooking purposes; also, the best base for pomatums and perfumery articles, as well as salves for medicinal purposes.

Having thus fully described my invention, and the manner in which the same is or may be carried into effect, what I claim, and desire to secure by Letters Patent, is—

The process or processes for the improvements in the manufacture of products from fresh fat, substantially as hereinbefore set forth.

In testimony whereof I have hereunto set my hand this 8th day of February, A. D. 1873.

ALFRED PARAF.

Witnesses:
FRANÇOIS LOEFFEL,
GEO. IRVING BANKS.